United States Patent
Ackermann et al.

(10) Patent No.: US 9,523,473 B2
(45) Date of Patent: Dec. 20, 2016

(54) DEVICE FOR CONTROLLING A LOW BEAM OF A VEHICLE

(75) Inventors: Ralf Ackermann, Kirchentellinsfurt (DE); Helmuth Eggers, Sindelfingen (DE); Gerhard Kurz, Wendlingen (DE); Joerg Moisel, Neu-Ulm (DE); Volker Oltmann, Calw (DE); Volker Reinhold, Herrenberg (DE); Bernd Woltermann, Fellbach (DE)

(73) Assignee: Daimler AG, Stuttgart ( * ) Notice: Subject to any disclaimer, the term of this patent is extended or adjusted under 35 U.S.C. 154(b) by 0 days.

(21) Appl. No.: 13/503,605

(22) PCT Filed: Sep. 7, 2010

(86) PCT No.: PCT/EP2010/005486
§ 371 (c)(1),
(2), (4) Date: May 22, 2012

(87) PCT Pub. No.: WO2011/047751
PCT Pub. Date: Apr. 28, 2011

(65) Prior Publication Data
US 2012/0229028 A1    Sep. 13, 2012

(30) Foreign Application Priority Data

Oct. 24, 2009  (DE) .................. 10 2009 050 622
Dec. 5, 2009   (DE) .................. 10 2009 057 219

(51) Int. Cl.
*B60Q 1/02*    (2006.01)
*F21S 8/10*    (2006.01)
(Continued)

(52) U.S. Cl.
CPC ............. *F21S 48/1794* (2013.01); *B60Q 1/04* (2013.01); *B60Q 1/085* (2013.01);
(Continued)

(58) Field of Classification Search
CPC ............. B60Q 1/08; B60Q 1/04; B60Q 1/085; B60Q 1/11; B60Q 1/12; B60Q 1/124; B60Q 2300/056; B60Q 2300/42; B60Q 2300/45
(Continued)

(56) References Cited

U.S. PATENT DOCUMENTS

| | | |
|---|---|---|
| 5,379,196 A | 1/1995 | Kobayashi et al. |
| 5,707,129 A | 1/1998 | Kobayashi |

(Continued)

FOREIGN PATENT DOCUMENTS

| | | |
|---|---|---|
| DE | 199 09 413 A1 | 9/2000 |
| DE | 10 2007 008 623 A1 | 9/2008 |

(Continued)

OTHER PUBLICATIONS

Anonymous, Dynamic Lights Adjustment driven by Traffic Situation, IP.Com, IPCOM000011860D, Mar. 20, 2003.*

(Continued)

*Primary Examiner* — Thai Pham
*Assistant Examiner* — Borna Alaeddini
(74) *Attorney, Agent, or Firm* — Crowell & Moring LLP (57) ABSTRACT

A device for controlling a driving light of a vehicle includes a headlight with a light source, a device for pivoting a produced light distribution and an optical element that provides adjustable light distribution. The optical element includes a light passage opening pivotable into an optical axis of the light source. A beam of the light distribution is limited or deflected such that a limited light field is produced in a pre-settable region in front of the vehicle, which light field has an external form of the light passage opening. Further light passage structures provide a "high beam" or "partial high beam" light pattern and thereafter the "high beam" light pattern by turning, pivoting and/or displacing (Continued)

the optical element in one direction, and another further light passage structure provides a "motorway" and thereafter a "country road" light pattern by turning, pivoting and/or displacing the optical element in an opposite direction.

3 Claims, 8 Drawing Sheets

(51) Int. Cl.
  *B60Q 1/04* (2006.01)
  *B60Q 1/08* (2006.01)
(52) U.S. Cl.
  CPC .... *B60Q 2300/056* (2013.01); *B60Q 2300/42* (2013.01); *B60Q 2300/45* (2013.01)
(58) Field of Classification Search
  USPC ... 315/82; 362/464, 465, 467, 512, 513, 539
  See application file for complete search history.

(56) References Cited

U.S. PATENT DOCUMENTS

| | | | |
|---|---|---|---|
| 6,281,806 B1* | 8/2001 | Smith | B60Q 1/085 340/436 |
| 6,409,369 B1* | 6/2002 | De Lamberterie | 362/518 |
| 7,090,385 B2* | 8/2006 | Sugimoto | B60Q 1/085 362/284 |
| 7,095,385 B2* | 8/2006 | Chen | 343/906 |
| 2006/0039158 A1 | 2/2006 | Kurz et al. | |
| 2007/0247865 A1* | 10/2007 | Kinoshita et al. | 362/538 |
| 2008/0084286 A1* | 4/2008 | Teramura et al. | 340/438 |
| 2008/0175012 A1* | 7/2008 | Shimaoka | B60Q 1/085 362/464 |
| 2008/0218085 A1* | 9/2008 | Sie | 315/82 |
| 2009/0016073 A1* | 1/2009 | Higgins-Luthman et al. | 362/465 |
| 2009/0143986 A1* | 6/2009 | Stein et al. | 701/301 |
| 2010/0020170 A1* | 1/2010 | Higgins-Luthman et al. | 348/135 |
| 2010/0033978 A1* | 2/2010 | Ehm | 362/465 |
| 2011/0261574 A1 | 10/2011 | Koppermann | |

FOREIGN PATENT DOCUMENTS

| | | |
|---|---|---|
| DE | 10 2007 053 138 A1 | 1/2009 |
| DE | 10 2009 035 327 A1 | 4/2010 |
| DE | 10 2008 053 945 A1 | 5/2010 |
| EP | 2 068 071 A1 | 6/2009 |
| JP | 5-342901 A | 12/1993 |
| JP | 7-108874 A | 4/1995 |
| JP | 7-137574 A | 5/1995 |
| JP | 8-106803 A | 4/1996 |
| JP | 11-28971 A | 2/1999 |
| JP | 2004-303634 A | 10/2004 |
| JP | 2004-349120 A | 12/2004 |
| JP | 2010-232081 | 10/2010 |
| WO | WO 2008/037388 A2 | 4/2008 |
| WO | WO 2008/037388 A3 | 4/2008 |
| WO | WO 2009/039882 A1 | 4/2009 |

OTHER PUBLICATIONS

German Search Report including English language translation dated Dec. 29, 2010 (Nine (9) pages).
International Search Report including English language translation dated Feb. 10, 2011 and PCT/ISA/237 Form (Fourteen (14) pages).
English translation of Japanese Office Action dated Aug. 21, 2013 (Two (2) pages).

* cited by examiner

DEVICE FOR CONTROLLING A LOW BEAM OF A VEHICLE

BACKGROUND AND SUMMARY OF THE INVENTION

Exemplary embodiments of the present invention relate to a device for controlling a driving light of a vehicle, comprising at least one headlight with at least one light source, means for pivoting a light distribution which is produced and at least one optical element by means of which a beam path of the light distribution is adjustable.

U.S. Pat. No. 5,707,129 A discloses a headlight for a motor vehicle that comprises a rotatable shade formed from a left hand and a right hand shade and produces a vertically controllable shielding means, by means of which a vertical movement and setting of a separating line of a low beam distribution produced by means of the headlight along a main optical axis is controllable. Furthermore, the headlight comprises a means for detecting a condition, in particular the curviness of a road, and a lateral adjusting means for adjusting the main optical axis of the low beam means in a horizontal plane. The rotatable shade is adjustable by a pre-set amount according to information on the curviness of the road, which can be determined by means of a steering angle sensor, so that the vertical movement and setting of the separating line can be produced. In addition, the headlight comprises a movable reflector with a lighting means arranged therein that is laterally pivotable by a pre-set amount such that a light distribution pattern and what is called a "hot zone" are movable and adjustable.

U.S. Patent Application Publication No. 2006/0039158 A1 discloses a vehicle headlight system comprising a light source and at least one reflector for shaping the light emitted by the light source into a high beam and a low beam. Furthermore, the vehicle headlight system comprises a first shield adjustable via an actuating element between a position in which the light from the light source is blocked across a maximum cross section and a position in which this light is substantially allowed to pass. In this case, the actuating element is adapted for adjusting the first shield in a plurality of intermediate positions between the maximal blocking and the essentially transmissive position in which the blocked cross section is less than the maximum cross section.

U.S. Pat. No. 6,281,806 B1 discloses an object detection and illumination system for a vehicle, by means of which the detection and illumination can be carried out such that the attention of a driver of the vehicle is directed to the detected object. The system comprises at least one sensor for collecting information about the surroundings of said vehicle, an image processing system for receiving data from the sensor and producing an output signal. In this case, it can be determined, by means of a processor, from the data of the sensor whether a particular object is located in the surroundings of the vehicle and requires the driver to be alerted. Further, the device comprises a light source drive system for receiving said output signal from said image processing system and for producing a light source control signal, the light source being able to be activated dependent on the control signal and the light distribution and direction of illumination of which can be controlled using the control signal. In such case, the light source is controllable such that the light distribution thereof can be directed continuously at the detected object, even if the vehicle and/or the object are moving relative to one another.

Furthermore, the non-published German Patent Application 10 2009 035 327.5 of the applicant of the present application describes a method for controlling a driving light of a vehicle with at least one headlight and with at least one sensor for detection of objects. In this case, if there is a risk of collision with at least one object, a special function of the driving light is activated to warn a driver of a vehicle and/or other road users.

Exemplary embodiments of the present invention are directed to a device for controlling a driving light of a vehicle which is improved compared with the prior art.

The device for controlling a driving light of a vehicle comprises at least one headlight with at least one light source, means for pivoting a light distribution which is produced and at least one optical element by means of which a beam path of the light distribution is adjustable, the optical element comprising a light passage opening and in the event of a detected dangerous situation being able to be pivoted into an optical axis of the light source, a beam of the light distribution being limited and/or deflected such that a limited light field can be produced in a pre-settable region in front of the vehicle, which light field has an external form of the light passage opening.

According to the invention, the optical element has further light passage structures arranged such that, starting from the light passage opening, by means of at least one of the further light passage structures a "high beam" light pattern or a "partial high beam" light pattern and thereafter the "high beam" light pattern can be produced by turning, pivoting and/or displacing the optical element in one direction, and by means of at least one of the further light passage structures a "motorway" light pattern and thereafter a "country road" light pattern can be produced by turning, pivoting and/or displacing the optical element in an opposite direction.

This makes it possible in particularly advantageous manner, even in the case of light sources which are in the form of gas discharge lamps and/or bulbs, to realize what is called a danger light function which can be easily controlled and is effective at low expense in terms of material and costs. In particular, the optical element is a roller or a shade, so that it can be used simultaneously for controlling the lighting range and various light distributions. It follows from this in a profitable manner that the danger light function and what is called an intelligent automatic light assistant can be realized simultaneously by means of the optical element.

Owing to the arrangement of the light passage opening and the further light passage structures on or in the optical element, all necessary light patterns of the vehicle can be produced by means of the one optical element and hence at low expense in terms of material and costs, with a transition between the light patterns taking place continuously and in a pleasant manner for a driver of the vehicle owing to the order of the arrangement of the light passage opening and the further light passage structures on or in the optical element.

BRIEF DESCRIPTION OF THE DRAWING FIGURES

Examples of embodiment of the invention will be explained in greater detail below with reference to drawings. Therein.

Parts which correspond to one another are provided with the same reference numerals in all the figures.

DETAILED DESCRIPTION

Figure 1:
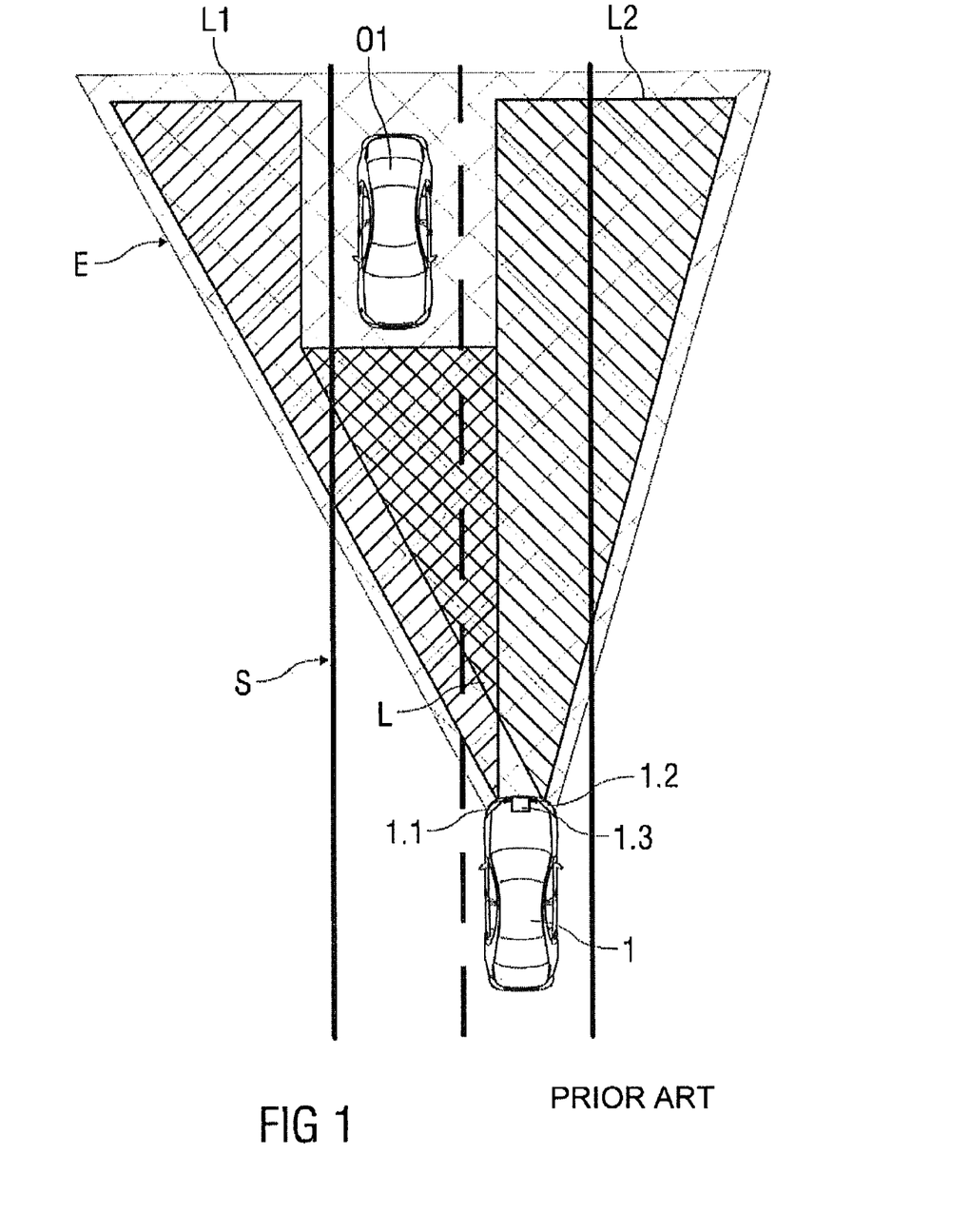
FIG. 1 diagrammatically illustrates a vehicle on a road and an object located in front of the vehicle in a top view, and a driving light distribution, produced by means of a device for controlling a driving light of the vehicle, according to the prior art, FIG. 2 diagrammatically illustrates the driving light distribution in a second view according to the prior art, FIG. 3 diagrammatically illustrates an embodiment of an optical element, formed as a roller, for producing the driving light distribution according to FIG. 1 according to the prior art, FIG. 4 diagrammatically illustrates a danger light distribution produced by means of the device for controlling the driving light of the vehicle, FIG. 5A diagrammatically illustrates an embodiment of an optical element, formed as a roller, for producing the danger light distribution of FIG. 4, FIG. 5B diagrammatically illustrates another view of the optical element illustrated in FIG. 5A, FIG. 6 diagrammatically illustrates an embodiment of an optical element, formed as a shade, for producing the danger light distribution of FIG. 4, FIG. 7 diagrammatically illustrates an arrangement of a light passage opening of the optical element in relation to the optical axis of a light source, and FIG. 8 diagrammatically illustrates a further arrangement of a light passage opening of the optical element in relation to the optical axis of a light source.

FIG. 1 shows a vehicle 1 that is moving on a road S. The vehicle 1 comprises two headlights 1.1, 1.2, which in a manner not shown further have light sources (i.e., lighting means), preferably gas discharge lamps or bulbs, in particular tungsten-halogen lamps. In this case, in particular separate light sources are provided for producing a low beam distribution and a high beam distribution.

The vehicle 1 further comprises at least one sensor 1.3 for detecting objects O1 in the surroundings of the vehicle 1, a detection region E of the sensor 1.3 in the example of embodiment illustrated extending over a wide far field region of the vehicle 1, so that the objects O1 in this far field region can be detected by means of the sensor 1.3 and a distance from the objects O1 can be determined.

In further preferred embodiments, preferably the entire area around the vehicle 1 is detected by means of the sensor 1.3 or a plurality of sensors 1.3. The sensor 1.3 or the plurality of sensors 1.3 is/are, for example, one or more radar sensors, cameras, stereo camera systems, infrared sensors, ultrasound sensors, lidar sensors and/or laser sensors. Preferably, a plurality of these sensors 1.3 are used, with a combination of different sensors 1.3 also being possible and advantageous in order to detect as large as possible an area around the vehicle 1.

By means of such sensors 1.3 and further sensors (not shown) of the vehicle 1, for example also a speed, an acceleration and a yaw rate of the vehicle 1, and a speed, an acceleration and a direction of movement of the detected objects O1, and also a relative speed and relative acceleration with regard to the vehicle 1 can be determined. In turn, a risk of collision of the at least one detected object O1 with the vehicle 1 can be determined from the data thus detected.

In addition to the detection of these data, a type of the object O1 is determined, with, in the example of embodiment illustrated, the object O1 being a further vehicle which is approaching the vehicle 1 on a left hand carriageway of the road S.

Furthermore, pedestrians, cyclists, animals, stationary objects, such as roadside structures, and further road users can be detected and determined as objects O1.

In an advantageous development, not illustrated in greater detail, it is possible to detect data of the object O1 also by means of a direct or indirect communications link of the vehicle 1 to the at least one object O1. These data comprise for example a position, a direction of travel, a speed and/or an acceleration of the object O1, so that a possible risk of collision of the vehicle 1 with the object O1 in the area around it can also be established on the basis of an evaluation of such data.

In particular, functions carried out by means of what is called an automatic light assistant can be realized in a particularly simple manner using the headlights 1.1, 1.2. An automatic light assistant in this case is understood to mean a driver assistance system that automatically sets a driving light L of the vehicle 1, dependent on moving and/or unmoving objects O1 detected in the surroundings of the vehicle 1, a current traffic situation and/or dependent on what type of road S the vehicle 1 is traveling on. In this case, the driving light L is switched automatically between a high beam, a partial high beam and a low beam, so that the driver of the vehicle F can drive with a permanently activated high beam setting, with a lighting range, an illumination characteristic and/or a horizontal pivoting angle being automatically set such that always a full illumination of the region located in front of the vehicle F which is adapted to the current situation occurs and other road users are not blinded.

In order to avoid blinding the object O1 by the driving light L of the vehicle 1, light distributions L1, L2 of the headlights 1.1, 1.2 can be adjusted using the automatic light assistant such that at least one position of the objects O1 detected by the sensor 1.3 is cut out of the light distributions L1, L2 in particular until a lighting range of the low beam is reached.

In the example of embodiment illustrated, the light distributions L1, L2 are set such that the driving light L of the headlights 1.1, 1.2 corresponds to a high beam distribution, with in each case a region being cut out of the light distributions L1, L2 in order to avoid blinding a driver of the oncoming vehicle, i.e., the object O1. In this case, the regions are cut out such that the light distributions L1, L2 in each case extend at most as far as an edge of the object O1. Thus, a driving light distribution is produced, which is referred to below as "high beam with defined gap".

Figure 2:
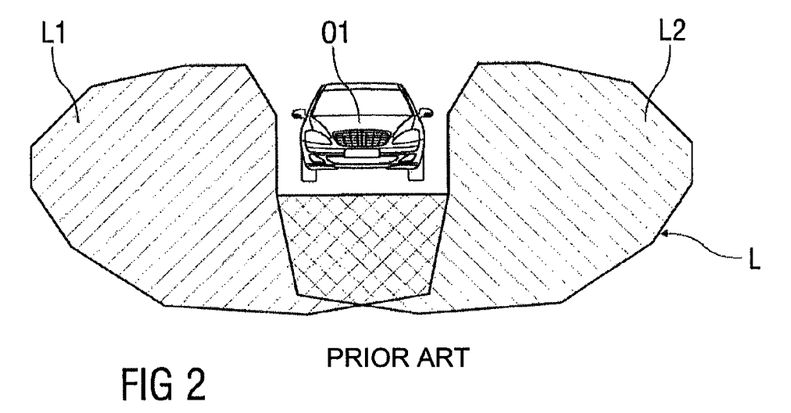

FIG. 2 shows this driving light distribution formed as a "high beam with defined gap" and the object O1 in a perspective view from the vehicle 1.

Figure 3:
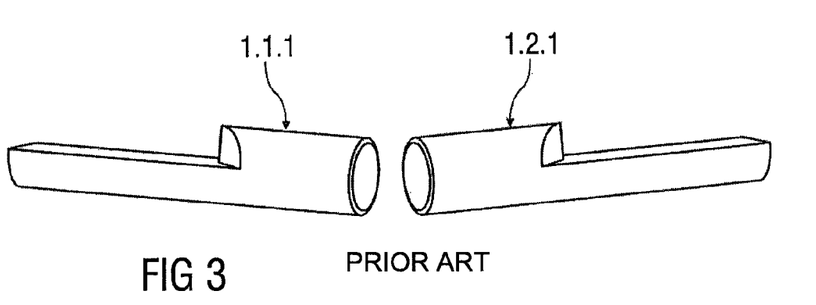

In order to produce the various light patterns and driving light distributions, the headlights 1.1, 1.2 of the vehicle 1 each comprise at least one optical element 1.1.1, 1.2.1, which as illustrated in FIG. 3, are formed, for example, as what are called rollers.

The respective roller in this case is arranged in front of the light source of the associated headlight 1.1, 1.2 and is also displaceable and rotatable in the horizontal and/or vertical direction. Furthermore, structures are applied and/or formed on a surface of the roller such that the various light distributions L1, L2, i.e., vertical and horizontal light/dark boundaries, can be produced by positioning the roller in front of the light source of the respective headlight 1.1, 1.2. The rollers of the headlights 1.1, 1.2 in this case are formed in particular complementarily to one another, in order to produce the light distributions L1, L2 illustrated.

In order to also achieve a cornering light function and/or turning light function by means of the headlights 1.1, 1.2, these preferably comprise means, not illustrated in greater detail, for horizontally pivoting the light distributions L1, L2. These means are, for example, electric motors and hydraulically operated means, by means of which the light sources themselves or for example reflectors, shades and/or rollers can be moved, so that the light distributions L1, L2 are pivoted, in particular dependent on a steering angle of the vehicle 1 and preferably dependent on the speed thereof, in order to obtain optimized visibility for the driver of the vehicle 1.

Figure 4:
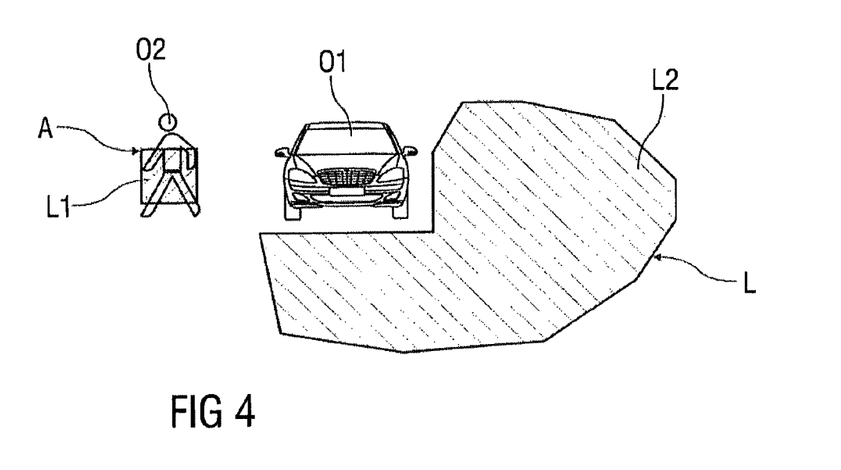

In FIG. 4, in addition to the object O1, a further object O2 is illustrated, in this example a pedestrian. However, reduced visibility of the further object O2 for the driver of the vehicle 1 may result from the illustrated driving light distribution according to the prior art of FIGS. 1 and 2, in particular in the case of such non-illuminated objects O2, such as pedestrians or animals, which in turns results in an increased risk of collision with the further object O2. In order to avoid this risk of collision, in the event of a detected risk of collision with the further object O2 a special function of the driving light L is activated.

FIG. 4 shows a possible example of embodiment of a special function of the driving light L of this type, with a beam of the light distribution L1 and/or light distribution L2 being limited and/or deflected such that a limited light field A, in particular what is called a spot, can be produced in a pre-settable region in front of the vehicle 1.

This limited light field A is preferably directed at the further object O2, with, in the example of embodiment illustrated, the light distribution L1 of the left hand headlight 1.1, in the direction of travel, of the vehicle 1 being formed as a limited light field A. In further examples of embodiment, not illustrated in greater detail, alternatively or additionally the light distribution L2 of the right hand headlight 1.2 may be formed such that a limited light field A can be produced thereby. By which headlight 1.1 or 1.2 the limited light field A is produced depends in particular on a relative position of the further object O2 relative to the vehicle 1.

Owing to the production of the limited light field A, the attention of the driver of the vehicle 1 is directed to the further object O2, so that he can take measures in good time in order to avoid a collision with the further object O2. Also, the attention of the further object O2 or, if the further object O2 is a vehicle, the attention of the driver thereof is directed to the approaching vehicle 1, so that the further object O2 or the driver thereof perceives the vehicle 1 in good time and likewise can take measures to avoid a collision with the vehicle 1.

Figure 5A:
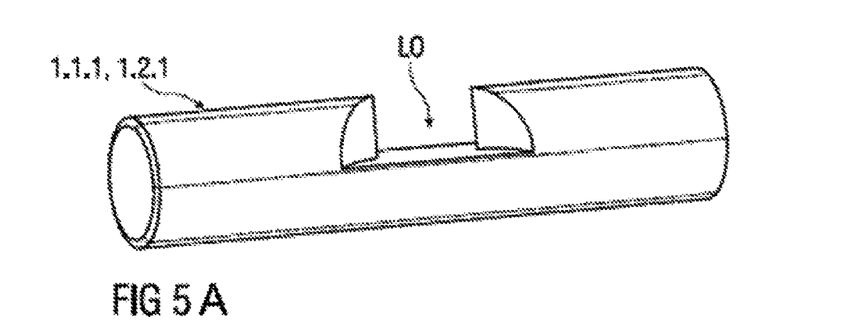

FIG. 5 shows an example of embodiment of the optical element 1.1.1 or 1.2.1 formed as a roller. The optical element 1.1.1 or 1.2.1, for producing the limited light field A, comprises a light passage opening LO and in the event of a detected dangerous situation, such as a risk of collision with the further object O2, is pivotable into an optical axis oA, illustrated in FIGS. 7 and 8, of the light source of the respective headlight 1.1, 1.2 such that the limited light field A is produced. The limited light field A in this case has the same external form as the light passage opening LO.

In this case, the light passage opening LO is preferably arranged substantially perpendicular to the optical axis oA of the light source.

The means for horizontally pivoting the light distributions L1, L2 are used in order to pivot the limited light field A onto the further object O2. Furthermore, preferably a height of the arrangement of the optical element 1 is selected such that a height of the limited light field A is also adjustable. Alternatively or additionally, means for performing a lighting regulation are actuated for setting the height. In this case, a horizontal light/dark boundary is preferably set such that blinding of people is ruled out.

Over the periphery of the optical element 1.1.1 and/or 1.2.1, which is formed as a roller, there are formed and/or applied, in addition to the light passage opening LO, further light passage structures so that in addition to the production of the limited light field A further light distributions L1 and/or L2 can be produced, which result in various what are called light patterns.

Figure 5B:
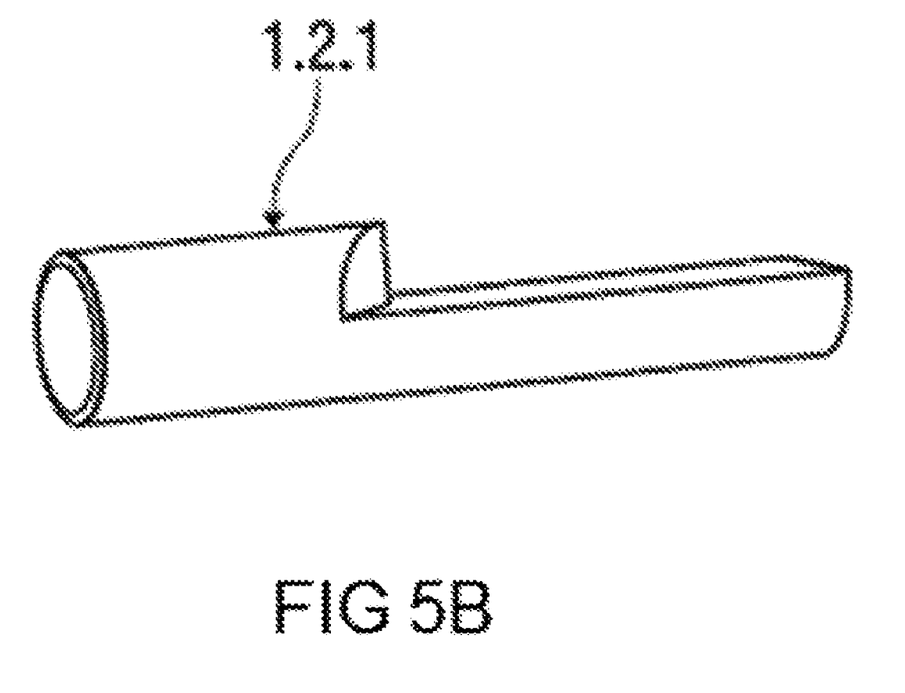

In this case, the optical element or elements 1.1.1 and/or 1.2.1 are formed such, and one or more light sources of one or both headlights 1.1, 1.2 are actuated such, that the following light patterns can be produced:

low beam with a limited light field A, what is called the spot, directed at the further object O2,
the "high beam with defined gap" driving light, (which is diagrammatically illustrated in FIG. 5B, which is another view of the optical element in FIG. 5A),
low beam with a limited light field A directed at the further object O2 by means of a headlight 1.1 or 1.2, and "high beam with defined gap" by means of the remaining headlight 1.2 or 1.1,
"flashing" of the headlights 1.1 and/or 1.2 by switching on and off the respective light source for producing the low beam with limited light field A directed at the further object O2 and the "low beam with defined gap".

The light passage structures on the optical elements 1.1.1 and/or 1.2.1 formed as a roller are preferably applied thereto such that an order of the light patterns upon rotation of the roller is formed as follows:

1. low beam distribution,
2. low beam with limited light field A directed at the further object O2,
3. partial high beam or a maximum lighting range set by means of a headlight range adjustment,
4. "high beam with defined gap",
5. high beam distribution,
1. low beam distribution, or
1. low beam distribution,
2. partial high beam or a maximum lighting range set by means of a headlight range adjustment,
3. high beam distribution,
4. "high beam with defined gap",
5. low beam with limited light field A directed at the further object O2,
1. low beam distribution.

The change between the different light patterns in this case can be carried out both for an individual headlight 1.1, 1.2 and between the headlights 1.1, 1.2, it being possible for the change to take place as "flashing" between the light patterns in that by turning, pivoting and/or displacing the optical element 1.1.1, 1.2.1 at a pre-set speed and in a pre-set rhythm in alternation the light passage opening LO and at least one further light passage structure are arranged in the optical axis oA of the light source.

This means that, for example, as long as a dangerous situation exists, it is possible to switch alternately from low beam with limited light field A directed at the further object O2 into the low beam distribution and back again. Analogously, it is possible to switch alternately from "high beam with defined gap" to the high beam distribution. An adjustment speed of the optical element 1.1.1, 1.2.1 and holding times for the respective light distributions are preferably specified with optimum values. Thus "flashing" can be carried out in particular in a frequency range between 2 Hz and 10 Hz. This increases the perception of the further object O2 by the driver of the vehicle 1 and improved perception of the vehicle 1 by the further object O2 or the driver thereof. At the same time, blinding of the further object O2 by the driving light L of the vehicle 1 is avoided.

In such case, upon lighting the further object O2 a time for setting to the target coordinates of the further object O2 is calculated and a speed of a rotation of the roller and also a speed of an actuation of the further means for setting the horizontal and vertical light/dark boundary are set matched to one another.

In this case, the light passage structures of the rollers for the right hand and the left hand headlight 1.1, 1.2 are preferably applied in a different order, so that changing of the light patterns can be effected as inconspicuously as possible.

In a particularly advantageous embodiment, different light passage structures are arranged on the rollers of the headlights 1.1, 1.2, so that different light patterns can be produced by means of the headlights 1.1, 1.2, which again results in low conspicuousness when changing the light patterns. In such case, for example the change, i.e., the flashing from the "low beam distribution" to the "low beam with limited light field A directed at the further object O2" can take place by means of the left hand headlight 1.1, and the flashing from the "high beam distribution" to the "high beam with defined gap" can take place by means of the right hand headlight 1.2.

In order to increase the conspicuousness of the "high beam with defined gap" light pattern, the other headlight 1.1, 1.2 in each case is preferably operated with the "low beam distribution" light pattern.

A width of the defined gap is in this case set by different overlapping of the light distributions L1, L2 using the optical elements 1.1.1 and/or 1.2.1, with additionally pivoting being effected horizontally across the region in question using the means for horizontally pivoting in the case of very extended further objects O2, such as for example a group of people.

Furthermore, preferably a light output of the light sources, when the danger light is active, is increased or is adapted to an ambient brightness in order to produce a high, adapted conspicuousness of the danger light.

According to a further configuration, additionally headlights, not illustrated in greater detail, or further lighting means of the headlights 1.1, 1.2 are activated in order to produce a turning light which is directed at further objects O2 located laterally in front of the vehicle 1.

Figure 6:
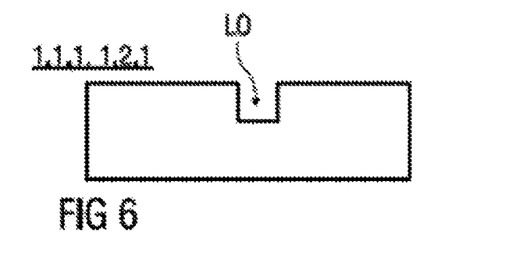

FIG. 6 illustrates an alternative embodiment of the optical elements 1.1.1, 1.2.1, these being formed as shades with a light passage opening LO. Likewise, the limited light field A and further light patterns can be produced by means of horizontal and/or vertical displacement of the shade.

Figure 7:
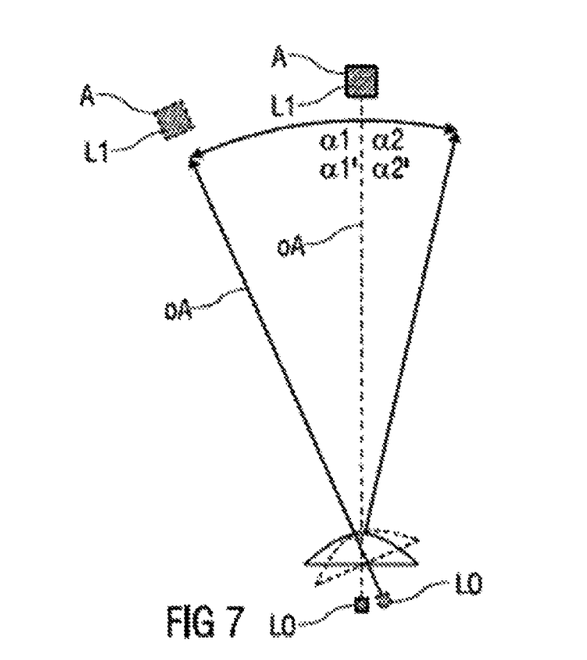

FIG. 7 shows an arrangement of the light passage opening LO of the optical element 1.1.1 in relation to the optical axis oA of the light source of the left hand headlight 1.1, the light passage opening LO being arranged on the optical axis oA. Owing to limited and asymmetrical pivotability using the means for horizontally pivoting by a left hand pivoting angle α1 of for example 15° and a right hand pivoting angle α2 of for example 7.5°, the pivoting angles α1' and α2' of the light passage opening LO and hence of the limited light field A are also asymmetrical.

In order to achieve a symmetrical danger light distribution and thus also to reach a right hand carriageway region with the limited light field A, the light passage opening LO, in accordance with a particularly advantageous development of the invention, is arranged offset in the horizontal direction relative to the optical axis oA of the light source.

Figure 8:
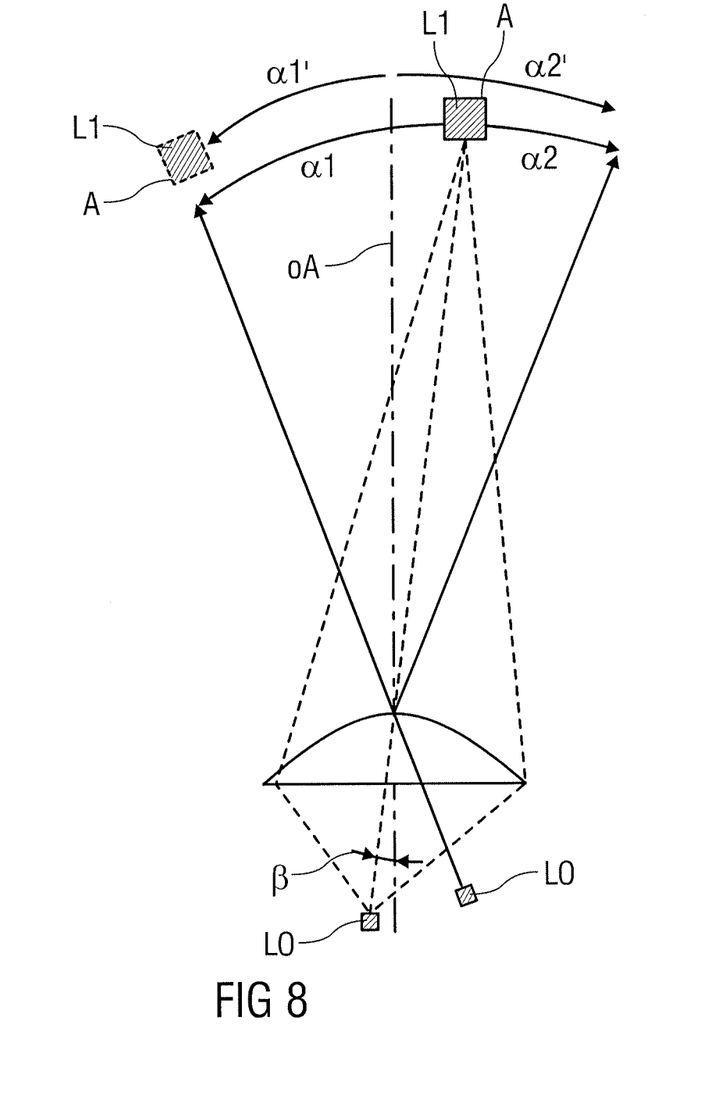

This arrangement is illustrated diagrammatically in FIG. 8. A horizontal displacement of the light passage opening LO by an angle β of, for example, 3.75° to the left in the case of a left hand pivoting angle α1 of, for example, 15° and a right hand pivoting angle α2 of, for example, 7.5° results in symmetrical pivotability of the limited light field A of 11.25° in each case by the pivoting angles α1' and α2', so that both a right hand and a left hand carriageway region can be reached with the limited light field A. In this manner the danger light distribution can be pivoted on to the individual object O2 to be illuminated with which there is a risk of collision.

In a development of the invention (not illustrated in greater detail), the light passage opening LO is additionally arranged vertically offset to the optical axis oA of the light source.

Figure 9:
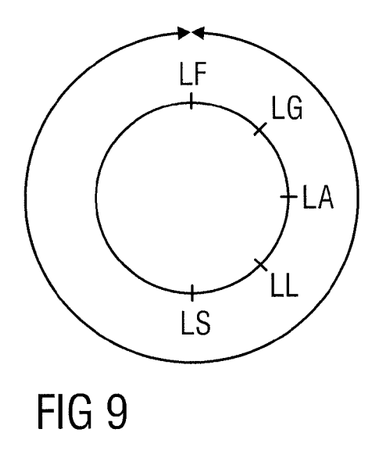
FIG. 9 diagrammatically illustrates a first sequence of light patterns that are to be set, FIG. 10 diagrammatically illustrates a second sequence of light patterns that are to be set, FIG. 11 diagrammatically illustrates a "symmetrical light" light pattern, FIG. 12 diagrammatically illustrates a "country road" light pattern, FIG. 13 diagrammatically illustrates a "motorway" light pattern, FIG. 14 diagrammatically illustrates a "danger light" light pattern, FIG. 15 diagrammatically illustrates a "high beam" light pattern, and FIG. 16 diagrammatically illustrates a "partial high beam" light pattern.
Figure 10:
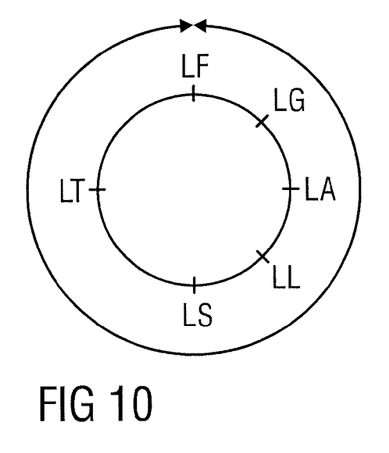
Figure 15:
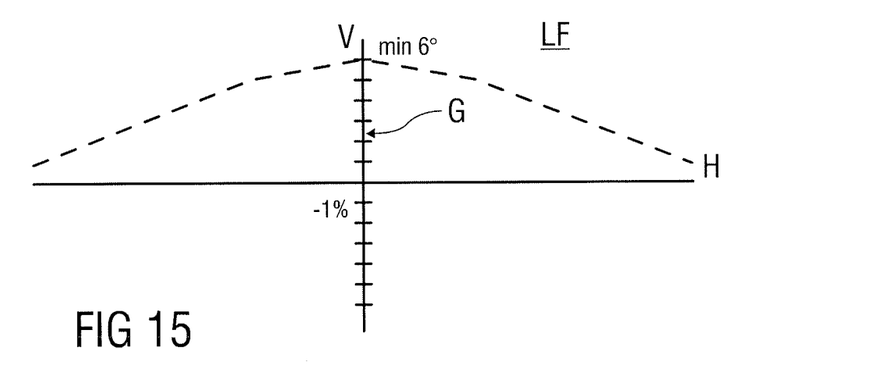
Figure 16:
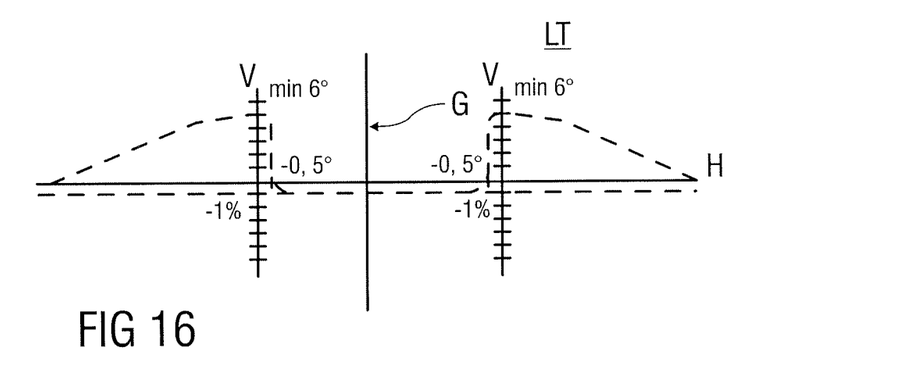

In order to be able to produce all the required light patterns of the vehicle 1, i.e., in addition to the light patterns described, further light patterns for use in normal traffic situations with one optical element 1.1.1, 1.2.1 per headlight 1.1, 1.2, the further light passage structures that are each formed differently, i.e., for example have a different width and/or height, in order to produce the various light patterns are arranged or formed according to the invention on or in the optical element 1.2.1, 9 such that with a preferred use of a roller as optical element 10, 1.1.1 the sequence of the light patterns illustrated in FIGS. 9 and 10 can be produced by turning, pivoting and/or displacing the optical element 1.2.1, 10, with FIG. 10 being a preferred embodiment that comprises the "partial high beam" light pattern LT, which is illustrated in greater detail in FIG. 16. FIG. 9 shows a simplified sequence without the "partial high beam" light pattern LT. In addition to the optional "partial high beam" light pattern LT, both sequences comprise the "symmetrical light" light pattern LS illustrated in greater detail in FIG. 11, the "country road" light pattern LL illustrated in greater detail in FIG. 12, the "motorway" light pattern LA illustrated in greater detail in FIG. 13, the "danger light" light pattern LG illustrated in greater detail in FIG. 14 and the "high beam" light pattern LF illustrated in greater detail in FIG. 15, which are adjustable by means of the roller as optical element 1.1.1, 1.2.1 in the order illustrated.

The light passage structures necessary for realizing the various light patterns and the light passage opening LO in this case are formed in the roller, distributed over a periphery of the roller with in each case different shaping, i.e. for example with a different width and/or height, in order to produce the respective light pattern by a different limitation in each case of a light beam emitted by the light source. The further light passage structures and the light passage opening LO in this case are distributed in such an order that, by turning, pivoting and/or displacing the roller, in succession the respective light passage structure is positioned in the optical axis oA of the light source in order to produce the respective light pattern by the corresponding limitation of the light beam emitted by the light source.

Accordingly, by means of the roller, in the embodiment illustrated in FIG. 9, upon turning in a direction, for example, starting from the "symmetrical light" light pattern LS it is possible to switch into the "country road" light pattern LL, then into the "motorway" light pattern LA, optionally using a maximum lighting range set by means of a headlight range adjustment, then into the "danger light" light pattern LG, then into the "high beam" light pattern LF and back again into the "symmetrical light" light pattern LS. This sequence is reversed accordingly by turning the roller in an opposite direction.

In the preferred embodiment illustrated in FIG. 10, upon turning in a direction in succession starting, for example, from the "symmetrical light" light pattern LS it is possible to switch into the "country road" light pattern LL, then into the "motorway" light pattern LA, then into the "danger light" light pattern LG, then into the "high beam" light pattern LF, then into the "partial high beam" light pattern LT and back again into the "symmetrical light" light pattern LS. Here too, this sequence is reversed accordingly by turning the roller in an opposite direction.

When using a shade as optical element 1.1.1, 1.2.1, the light passage opening LO and the various further light passage structures are distributed, for example, horizontally and/or vertically over a surface of the shade for production purposes. They are arranged such that another light passage structure is arranged in the optical axis oA of the light source for example by horizontal or vertical displacement of the shade, the differently formed light passage structures being arranged in such an order that the light patterns can be produced in the pre-set order by, in each case, a partial horizontal or vertical displacement of the shade. Accordingly, by means of the shade the sequence of the light patterns illustrated in FIG. 9 can be produced in the event that no "partial high beam" light pattern LT is used. When using the "partial high beam" light pattern LT, the sequence deviates somewhat from FIG. 10, so that, for example starting from the "symmetrical light" light pattern LS it is possible to switch into the "country road" light pattern LL, then into the "motorway" light pattern LA, then into the "danger light" light pattern LG, then into the "partial high beam" light pattern LT, then into the "high beam" light pattern LF and back again into the "symmetrical light" light pattern LS, and vice versa.

Figure 14:
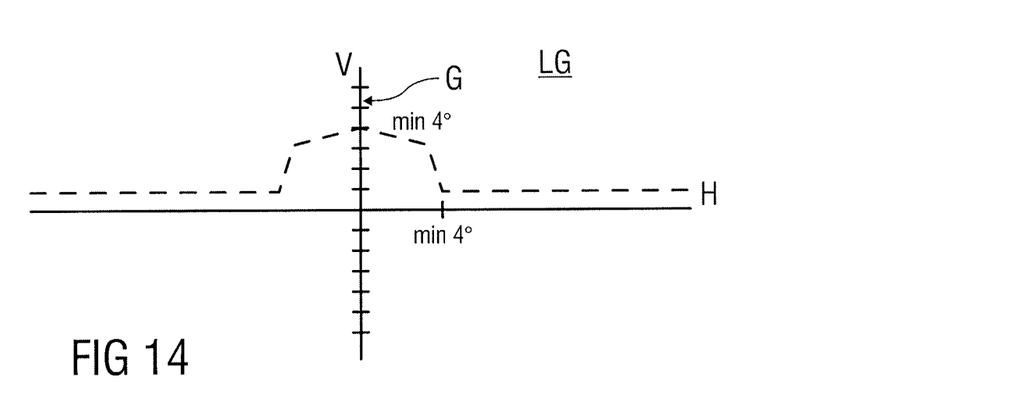

Due to this realization of the sequence of the light patterns according to the invention, the individual light patterns can be obtained in an attractive manner which can be realized quickly, with in particular a transition between the individual light patterns taking place in fluid manner and as inconspicuously and non-disruptively as possible for a driver of the vehicle. In order to realize as fluid and steady as possible a transition from the "motorway" light pattern LA into the "high beam" light pattern LF via the "danger light" light pattern LG, an appearance of the "danger light" light pattern LG should be configured correspondingly by corresponding shaping of the light passage opening LO such that the "danger light" light pattern LG corresponds to a miniaturized "high beam" light pattern LF, as illustrated in FIG. 14 compared with FIG. 15. That is to say that the light passage opening for realizing the "high beam" light pattern LF is, for example, cut somewhat deeper into a rolling body of the roller that is formed as the optical element 1.1.1, 1.2.1 and has a somewhat greater extent in order to limit the light beam emitted by the light source such that the "high beam" light pattern LF can be formed.

A path of the light/dark boundary of the "danger light" light pattern LG is formed comparably with the path of the light/dark boundary of the "high beam" light pattern LF, but with considerably smaller dimensions, i.e., a vertical extent V and in particular a horizontal extent H of the "danger light" light pattern LG are considerably smaller than the vertical extent V and the horizontal extent H of the "high beam" light pattern LF. In this manner it is possible to switch from the "motorway" light pattern LA by running over the "danger light" light pattern LG into the "high beam" light pattern LF without setting a currently unnecessary "danger light" light pattern LG longer than during the running over, which would irritate the driver of the vehicle. Furthermore, a contrast of the light/dark boundary of the "danger light" light pattern LG is made to be slight, so that no disturbing edges are visible when running over the "danger light" light pattern LG and a fluid transition into the "high beam" light pattern LF is permitted.

Furthermore, the light passage opening LO is formed and arranged such that the light field A, when the light distribution L1, L2 is not pivoted, can be produced symmetrically to a straight-ahead axis G of the vehicle 1, an extent of the light field A being smaller than an extent of a high beam surface that can be produced by the "high beam" light pattern LF, i.e., the "danger light" light pattern LG is formed symmetrically to the straight-ahead axis G of the vehicle 1, with also the brightest region of the "danger light" light pattern LG lying on the straight-ahead axis G (the straight-ahead axis G is represented by the vertical line in FIGS. 11 to 16). This means that the "danger light" light pattern LG can be realized with the brightest illumination region of the headlight 1.1, 1.2, and switching for example from the "country road" light pattern LL or from the "motorway" light pattern LA into the "high beam" light pattern LF is permitted without an additional pivoting movement of the light distribution L1, L2.

In this manner, the impression is given to the driver of the vehicle that illumination increases constantly outwards from the middle of a light cone, what is called the light centre, which means that such a change of light pattern has a very harmonious effect. In such case, such a transition between the light patterns should preferably be covered at a fixedly pre-set rate, so that the effect on the driver of the vehicle is always constantly harmonious.

Figure 11:
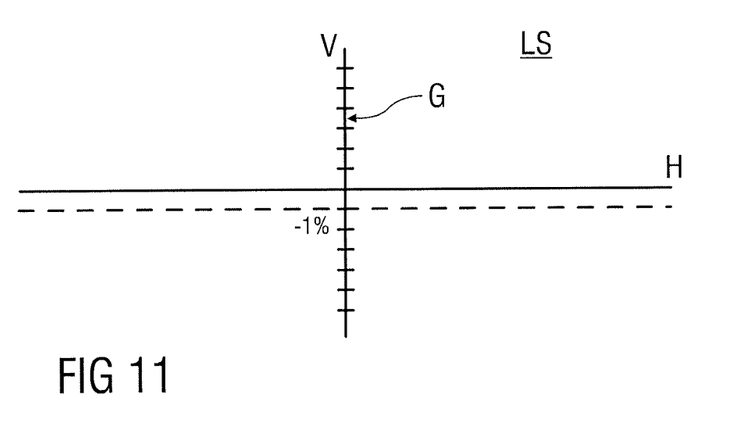
Figure 12:
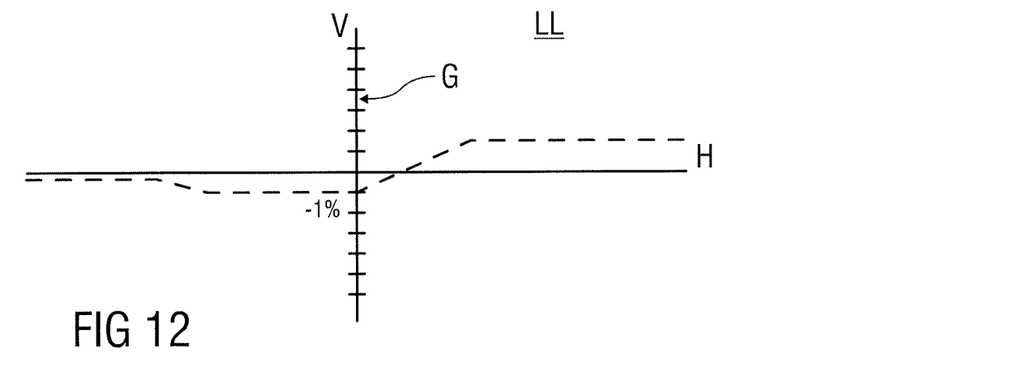
Figure 13:
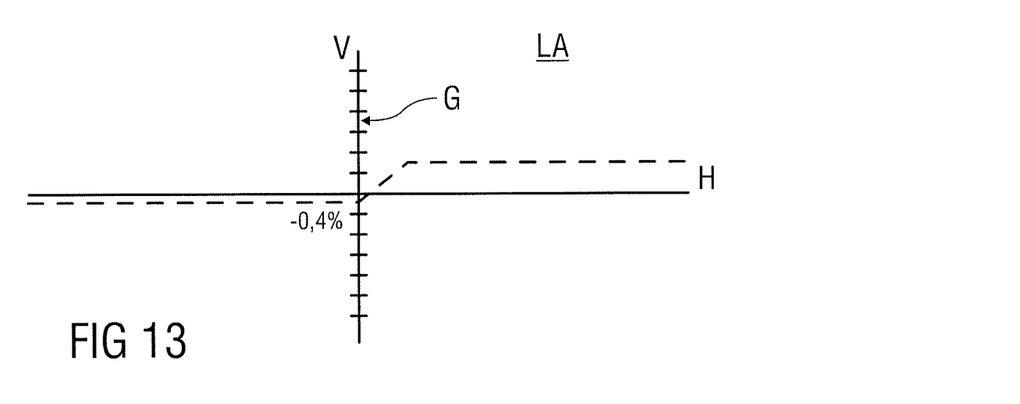

The various light patterns, and in particular the respective vertical extent V and horizontal extent H thereof, are illustrated in greater detail in FIGS. 11 to 16, with a shaping, in particular an external form of the respective light passage structure formed in the optical element 1.1.1, 1.2.1, corresponding to an external form of the respective light pattern. The "symmetrical light" light pattern LS illustrated in FIG. 11 is oriented horizontally and directed slightly downwards. The "country road" light pattern LL illustrated in FIG. 12 is initially lowered to the left of the straight-ahead axis G and raised again somewhat further to the left in order not to blind the oncoming traffic, which on country roads passes very close to the vehicle 1. The vertical extent of the right hand part of the "country road" light pattern LL is considerably larger, in order to obtain good full illumination on a lane of the vehicle 1. This applies analogously to the "motorway" light pattern LA illustrated in FIG. 13, with in this image the left hand part being constantly lowered in order not to blind the oncoming traffic, which passes the vehicle 1 at a greater lateral distance.

The "danger light" light pattern LG illustrated in FIG. 14 and the "high beam" light pattern LF illustrated in FIG. 15 are formed as already described above, with the "high beam" light pattern LF having both a maximum possible horizontal extent H and a maximum possible vertical extent V, so that maximum possible full illumination of a far field region of the vehicle 1 is permitted. The "partial high beam" light pattern LT illustrated in FIG. 16, in the case of non-pivoted light distributions L1, L2, has a lowering of the vertical extent V in the region of the straight-ahead axis G relative to the "high beam" light pattern LF, so that for example blinding of a vehicle traveling ahead or an oncoming vehicle is avoided, but maximum possible lateral full illumination of the far field region of the vehicle 1 is permitted. In this manner, for example, pedestrians on the edge of the roadway can be recognized in very good time by the driver of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for controlling a driving light of a vehicle, the device comprising:
   a left hand headlight and a right hand headlight, each comprising an optical element configured to produce a light pattern or a driving light distribution, wherein the optical elements are rollers that include a periphery on which a plurality of light passage structures are arranged to produce various light patterns or driving light distributions, wherein the plurality of light passage structures are arranged on the periphery of the rollers in a manner that rotation of the rollers about a longitudinal axis of the rollers moves different light passage structures in front of light produced by the left hand headlight and the right hand headlight;
   a sensor system configured to recognize objects and detecting surroundings, wherein the sensor system is configured to detect a risk of collision with a non-illuminated object,
   wherein the roller for the left hand headlight differs from the roller for the right hand headlight with respect to at least one light passage structure having a different width or height such that a light pattern producible by the left hand headlight is different from a light pattern producible by the right hand headlight, the roller of the left hand headlight having a light passage structure in the form of a light passage opening configured to produce a limited light field in a form of a spot on the non-illuminated object in front of the vehicle, and wherein the light passage opening is arranged offset in the vertical or horizontal direction to an optical axis of a light source, to provide a symmetrical pivotability for the limited light field,
   wherein the rollers are horizontally pivotable and a height and width of the plurality of light passage structures arranged on the periphery of the rollers does not change with the horizontal pivoting of the rollers, and
   wherein configuration of the roller of the right hand headlight produces a light pattern or driving light distribution according to whether an oncoming vehicle or vehicle traveling ahead is located in front of the vehicle, such that an oncoming vehicle or a vehicle traveling ahead is not blinded.

2. The device as claimed in claim 1, wherein the roller of the left hand headlight is configured such that, starting from the light passage opening for a limited light field, turning in one direction produces a high beam light pattern or a partial high beam light pattern and thereafter the high beam light pattern as a nearest light pattern.

3. The device as claimed in claim 1, wherein in the event of a detected situation, the left or right hand headlights are flashed by
   switching on and off a respective light source, or
   an alternating change of light passage structures.

* * * * *